May 14, 1968  J. BERKES ET AL  3,382,668
SUPPORTING CHAIN FOR ENERGY CARRIERS
Filed Sept. 22, 1965  4 Sheets-Sheet 3
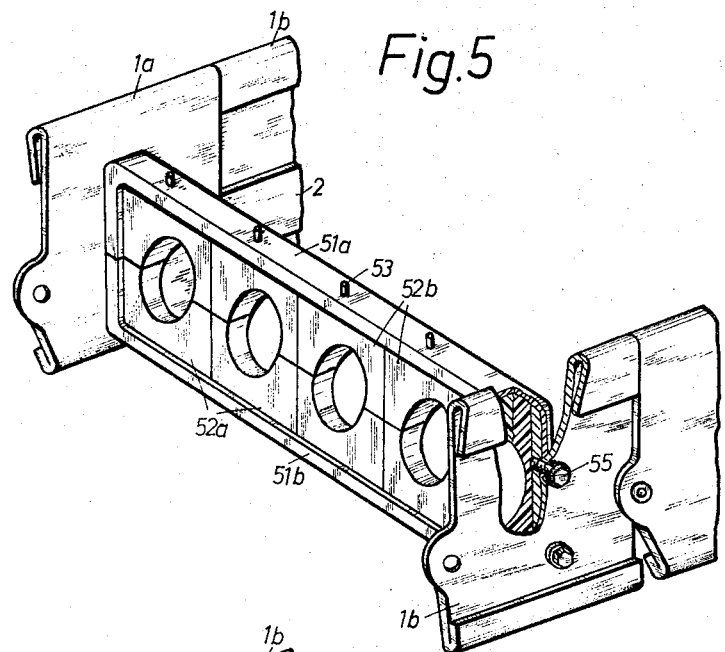
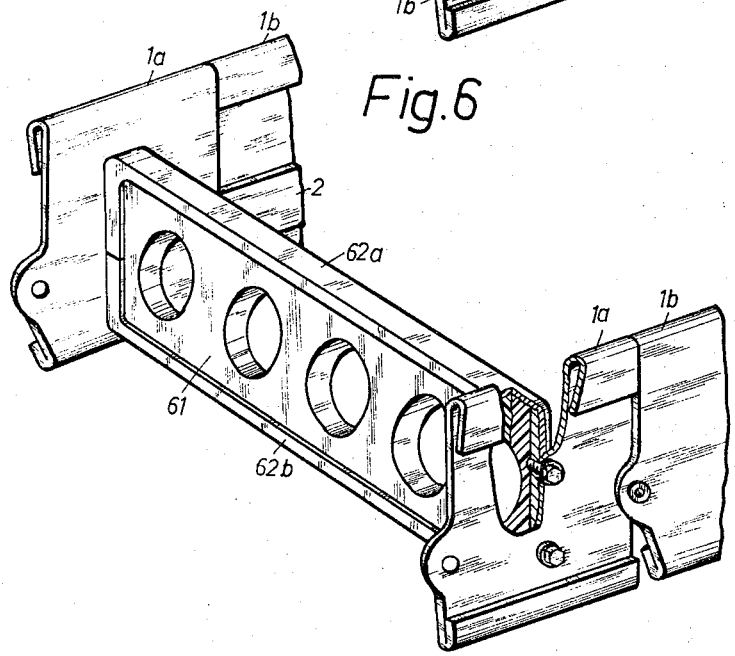

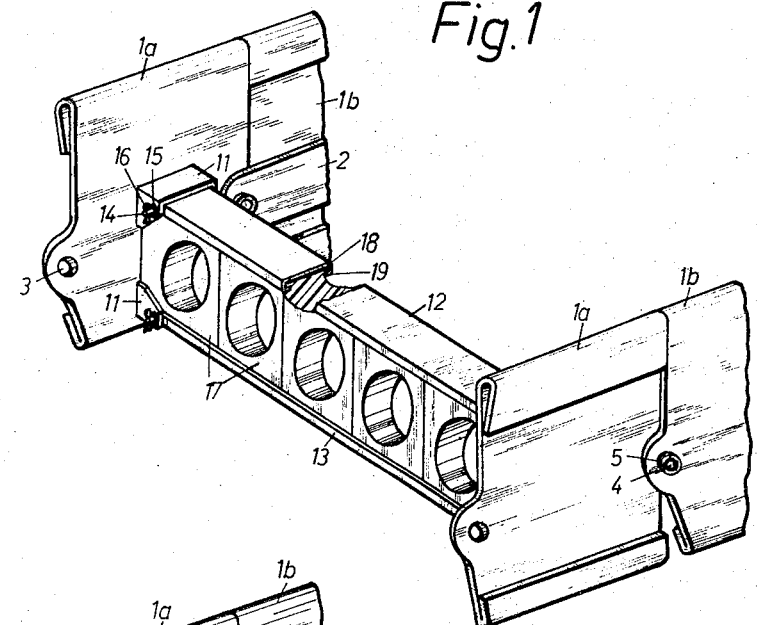
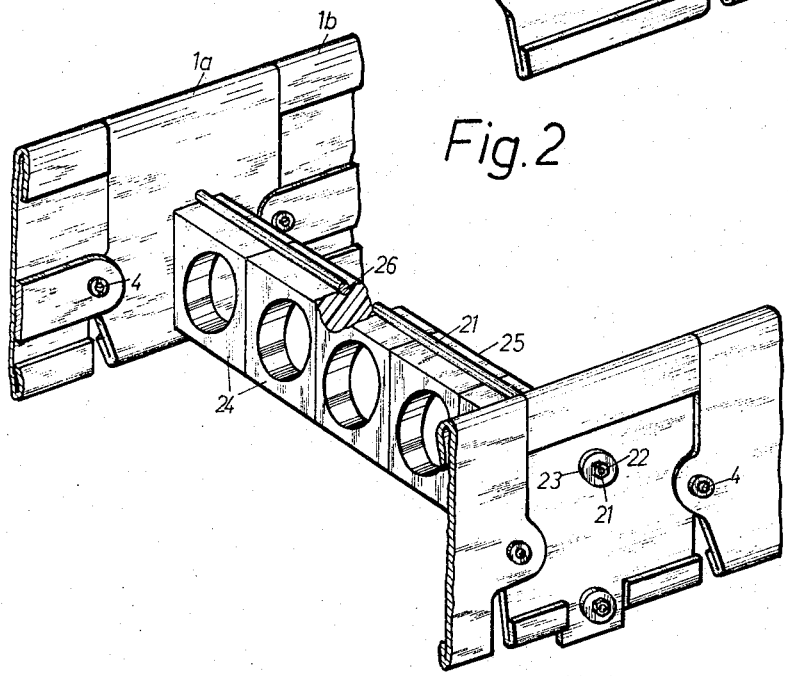

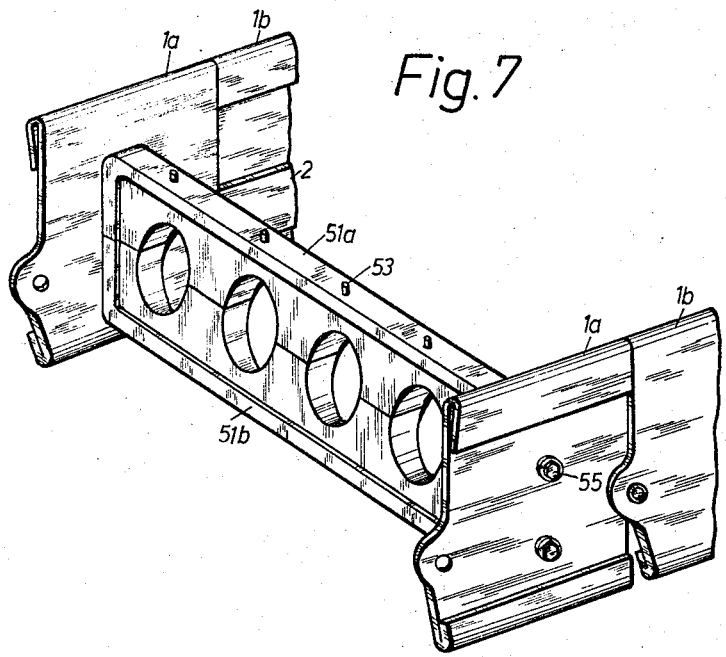
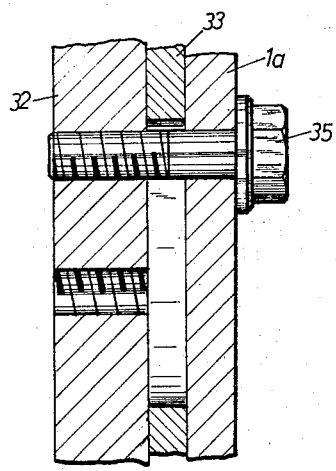

United States Patent Office 3,382,668
Patented May 14, 1968

3,382,668
SUPPORTING CHAIN FOR ENERGY CARRIERS
Josef Berkes, Siegen, Karl-Heinz Enders, Eiserfeld, and Walter Klein, Neunkirchen, Germany, assignors to Kabelschlepp G.m.b.H., Siegen, Westphalia, Germany
Filed Sept. 22, 1965, Ser. No. 489,366
Claims priority, application Germany, Sept. 23, 1964, K 54,074
8 Claims. (Cl. 59—78.1)

The present invention relates to a supporting chain for energy carriers, such as cables, hoses, flexible shafts, and the like, through which energy is conveyed to movable consumers, as for instance a carriage of a machine tool or to trolleys of cranes.

With heretofore known arrangements of the type involved, the chain bands composed of the chain links on each side of the energy conveying means are interconnected in pairs by means of one or more webs so as to form a single chain link structure. The bores in said webs receive the cables, hoses, flexible shafts, or the like, and the said webs perform a double function, namely they function as receiving and supporting members for the energy carriers and also form the transverse connection between the chain bands. This double function is disadvantageous from a structural as well as from a functional standpoint.

It is, therefore, an object of the present invention to provide a supporting chain for energy carriers, such as cables, hoses, and the like, which will overcome the above-mentioned drawbacks.

It is another object of this invention to provide a supporting chain as set forth in the preceding paragraph, in which the functions of the transverse members between the chain bands with regard to stiffening the chain as well as supporting the energy carriers are separated.

These and other objects and advantages of the invention will appear more clearly from the following specification in connection with the accompanying drawings, in which:

FIG. 1 illustrates an isometric view of a portion of a supporting chain according to the present invention.

FIG. 2 is a view similar to that of FIG. 1 of a portion of a modified supporting chain which differs from that of FIG. 1 primarily in that between the inner links of the chain there are provided round cross tie rods.

FIG. 5 illustrates still another modification of the present invention according to which the energy carrier supporting inserts are subdivided into an upper and lower portion.

FIG. 6 shows an embodiment according to the present invention in which a single uniform apertured plate forms the insert for each transverse member.

FIG. 7 illustrates an embodiment wherein the energy carrier supporting insert is horizontally divided into an upper and lower portion.

FIG. 8 illustrates a sectional view of the chain construction.

Figure 3:
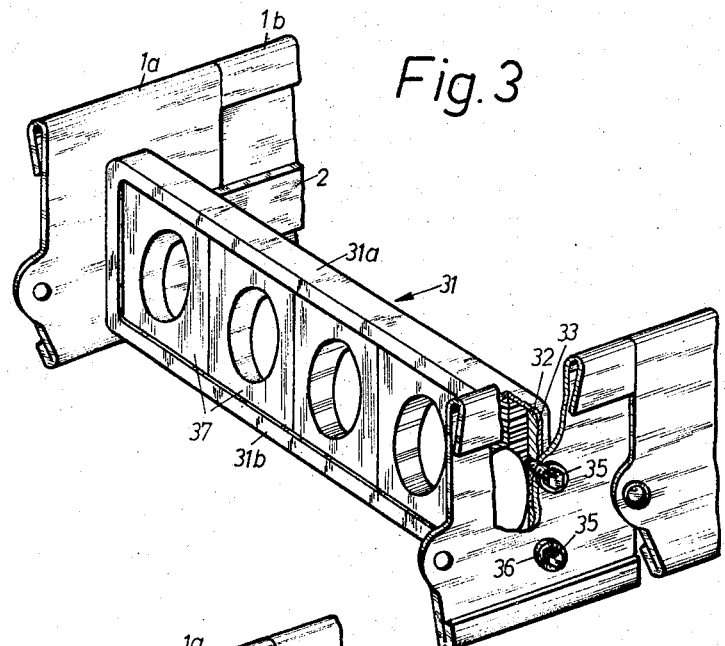
FIG. 3 illustrates a portion of a supporting chain according to the invention in which the transverse members between the chain bands are formed of two frame portions having the chain supporting members inserted therein.

The supporting chain for energy carriers according to the present invention in which each pair of oppositely located chain links is interconnected by transverse means is characterized primarily in that the chain links are interconnected by frame means or transverse tie rods having arranged thereon exchangeable apertured supporting means for receiving the energy carriers. With this arrangement, the cross tie rods or frame means can be so dimensioned that they will be well able to absorb the necessary forces while on the other hand the inserted apertured supporting means for the energy carriers can easily be dimensioned in conformity with the dimensions of the energy carriers.

In addition thereto, there exists the possibility to subdivide the energy supporting means which depending on the purpose of the chain have to have a certain aperture pattern so that the individual sections may be provided with one or more apertures. The energy carrier supporting means composed of a plurality of sections may be arranged adjacent to each other and/or above each other in the respective transverse frame. This represents a great economy in stocking the elements and also affords the possibility to make the energy carrier supporting means of any suitable material strong enough to support the energy carriers and independent of the material for the transverse frames.

The transverse frames which may be connected to the chain links, for instance by shoes, may have a C-shaped profile to permit the slidable insertion of the individual energy carrier supporting elements. When the transverse supporting means or tie rods consist of round bars threadedly connected to the chain links, the energy carrier supporting members may be provided on two oppositely located sides with semicircular recesses for engagement by the round cross tie rods whereby the individual energy carrier supporting means are aligned with regard to each other.

If desired, the transverse frame may be composed of two sections for receiving the apertured energy carrier supporting means. The said two sectional frames may be connected to the chain links by a thread connection. According to another embodiment, the transverse stiffening members may be connected by gusset plates to the chain links. If desired, the apertured supporting means may be composed of two sections respectively connected to the transverse frame sections.

Referring now to the drawings in detail and FIG. 1 thereof in particular, the supporting chain or energy carriers illustrated therein are composed primarily of alternate inner links 1a and outer links 1b while in addition to the outer links 1b there are provided longitudinal plate-shaped links 2 which are at bores 3 in the chain links linked thereto by a rivet 4 and a disc 5.

The inner links 1a of each chain band have connected thereto shoes 11, for instance by screwing or welding. The said shoes 11 are engaged by transverse members 12 and 13 which are spaced from each other in the direction of the height of the chain links, said transverse members 12 and 13 being connected to said shoes by means of bolts 14, discs 15 and splines 16. The transverse members 12 and 13 of FIG. 1 have a U-shaped profile. If desired, these transverse members may also be bent so as to have their legs bent inwardly as indicated at 19 so that the profile of said members 12 and 13 is C-shaped. Arranged between the two transverse members 12 and 13 are perforated inserts 17 for receiving the energy carriers, such as cables, hoses, and the like. When employing a C-shaped profile for the members 12 and 13, it is possible to insert into said profiles the entire perforated means prior to assembling the chain. With such an arrangement, the perforated elements 17 may be inserted and exchanged at random, and it is possible to insert between said members 12 and 13 energy carrier supporting members with different apertures.

According to the embodiment illustrated in FIG. 2, between each two oppositely located inner links 1a there are provided two round cross tie-rods 21 which extend through bores in the inner links 1a and are connected thereto by means of nuts 22 and washers 23. The perforated members 24 are arranged between said rods 21 and to this end have their top and bottom sides 25 and 25a provided with semi-circular recesses 26 in conformity with the circumferential shape of rods 21. In this way, i.e. by engagement of the tie-rods 21 with the semi-circular recesses 26, the apertured energy carrier supporting means 24 are firmly held between said tie-rod 21 (only the upper tie rod being shown) while simultaneously the energy carrier supporting members 24 are properly aligned with regard to each other.

According to the embodiment of FIGS. 1 and 2, the apertured members 17 and 24 respectively contribute to a stiffening of the chain in transverse direction.

FIG. 3 illustrates a modified supporting chain according to the present invention in which between each two oppositely located inner links 1a there is arranged a frame 31 which is composed of two sections 31a and 31b. Frame 31 has a U-shaped cross section. Sections 31a and 31b are connected to respective oppositely located inner chain links 1a by means of screws 35 and washers 36. The screws are passed through slot holes in the frame sections and then are screwed into a plate 32 which is provided with correspondingly threaded bores. This plate 32 engages the two end faces of the frame sections and thereby aligns the same.

In order when said screws 35 should become loose to prevent a displacement of frame sections 31a and 31b with regard to each other, the frame sections are provided with a hump or the like 33 engaging a corresponding recess in the respective adjacent plate 32. The energy carrier supporting members 37 proper are inserted into the frame 31. This may be effected in such a way that the screws 35 pertaining to frame section 31a are loosened at both chain bands, and the upper frame section is then pulled upwardly by the length of the slit hole. Thereupon the apertured elements 37 are inserted. Thereafter the upper frame section 31a is returned to its previous position and after the hump 33 has engaged the respective depression in plate 32, screws 35 are tightened.

Figure 4:
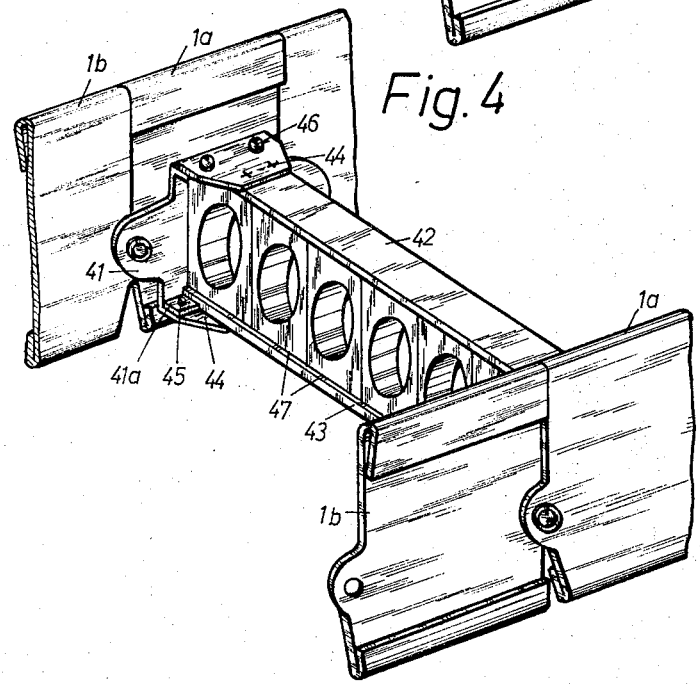
FIG. 4 represents a portion of a further modified supporting chain according to the invention which comprises lateral frame parts connected to the transverse members.

FIG. 4 represents a portion of a modified supporting chain according to the invention with a transverse frame arranged in front of an outer link 1b. According to the arrangement of FIG. 4, the customary longitudinal links or fish plates have been designed in the form of lateral frame members 41 with angled-off connecting ears 41a which through the intervention of gusset plates 44 are connected to the respective adjacent transverse frame members 42 and 43. This connection may be effected in any convenient manner, for instance by spot welding. Gusset plates 44 rest on ears 41a and are connected thereto by means of screws 46 with welded-on nuts 45. Between the transverse member 42 and 43 there are inserted the energy carrier supporting means 47. The frame sections 42 and 43 may have a U-shaped cross section or a C-shaped cross section as described above in connection with FIG. 1.

If a further transverse stiffening of the chain is necessary, the frame sections 41 may additionally be connected with the outer links 1b of the chain by threaded bolts.

FIG. 5 shows a portion of another modification of a supporting chain according to the present invention. According to this embodiment, each apertured element is additionally sub-divided along a transverse plane, and the thus obtained sections 52a and 52b are respectively connected to the frame sections 51a and 51b by means of screws 53. In this way, the entire frame upper section, which means the upper frame section 51a together with the upper sections 52b can be withdrawn upwardly after the side screws 55 have been loosened. This makes it possible to insert the cables and hoses and the like into the lower energy carrier supporting members 52a and to withdraw the energy carriers therefrom without the necessity of threading or passing the energy carriers through the complete apertures.

Finally, FIG. 6 shows a further embodiment of the invention according to which a single apertured element 61 is inserted between the frame sections 62a and 62b.

It is, of course, to be understood that the present invention is, by no means, limited to the particular constructions shown in the drawings but also comprises any modifications within the scope of the appended claims. Thus, the profile of the frame members or transverse stiffening means may vary from the shape shown in the drawings, and also the connecting means for connecting said frame means to the respective chain links may be different from those shown in the drawings. Furthermore, the individual energy carrier supporting members 17, 24, 37 or 47 or the sections of said apertured energy carrier supporting means 52a and 52b, as well as the single piece energy carrier supporting member 61, may have different numbers of apertures. From the above, it is also evident that the bores of the energy carrier supporting means in a transverse frame or the like do not have to have apertures of the same diameter but may also have apertures of different diameters. While the individual energy carrier supporting means have been shown as aligned alongside each other, it is, of course, also possible to vary the height of the frame or frame sections so as to permit the arrangement of energy carrier supporting means above each other.

What we claim is:

1. A chain for supporting energy carriers, especially cables and hoses, for guiding the same to movable consumers, which includes: two substantially parallelly spaced chain bands, each of said chain bands being composed of pivotally interconnected chain link means, and transverse means extending transverse to the longitudinal extension of said chain bands and interconnecting the same, each of said transverse means comprising bracing means interposed between and firmly interconnecting oppositely located chain link means of said chain bands, each of said transverse means also including apertured supporting means exchangeably supported by said bracing means for receiving and supporting energy carriers.

2. A chain according to claim 1, in which said apertured supporting means exchangeably supported by said bracing means comprise a plurality of apertured individually exchangeable members arranged in edge to edge relationship with regard to each other.

3. A chain according to claim 1, in which said apertured supporting means exchangeably supported by said bracing means comprise a plurality of apertured individually exchangeable members arranged in a plurality of superimposed rows.

4. A chain for supporting energy carriers, especially cables and hoses, for guiding the same to movable consumers, which includes: two substantially parallelly spaced chain bands, each of said chain bands being composed of pivotally interconnected chain link means, and transverse means extending transverse to the longitudinal extension of said chain bands and being spaced from each other in the longitudinal direction of said bands, each of said transverse means comprising frame means having a C-shaped cross section and being interposed between and firmly interconnecting oppositely located chain link means, each of said transverse means also including apertured supporting means slidably and exchangeably arranged in said frame means for receiving and supporting energy carriers.

5. A chain for supporting energy carriers, especially cables and hoses, for guiding the same to movable consumers, which includes: two substantially parallelly spaced chain bands, each of said chain bands being composed of pivotally interconnected chain link means, and transverse means extending transverse to the longitudinal extension of said chain bands, each of said transverse means comprising bars of substantially circular cross section bolted to oppositely located link means respectively pertaining to said bands, each of said transverse means also including apertured supporting means exchangeably interposed between said bars and having edge portions adjacent said bars provided with recess means for engagement with said bars.

6. A chain for supporting energy carriers, especially cables and hoses, for guiding the same to movable consumers, which includes: two substantially parallelly spaced bands, each of said chain bands being composed of pivotally interconnected chain link means, transverse means extending transverse to the longitudinal extension of said chain bands, each of said transverse means comprising a frame composed of two sections adapted selectively to be withdrawn from each other and to be moved into engagement with each other, and means for firmly connecting the end portions of said frame to oppositely located link means of said bands, each of said transverse means also including apertured supporting means exchangeably insertable into said frame.

7. A chain according to claim 6, in which said supporting means are composed of two sections respectively connected to said frame sections.

8. A chain according to claim 1, in which each of said transverse means comprises two plate members respectively pivotally interconnecting two spaced link means of each of said bands, and in which each of said bracing means also includes two gusset plates connected to said plate members and said bracing means.

References Cited

UNITED STATES PATENTS

| | | | |
|---|---|---|---|
| 2,806,363 | 9/1957 | Manne | 59—79.1 |
| 2,975,807 | 3/1961 | Waringer | 138—108 |
| 3,197,954 | 8/1965 | Merker | 138—108 |
| 3,233,850 | 2/1966 | Merker | 138—108 |

CHARLES W. LANHAM, *Primary Examiner.*

G. P. CROSBY, *Assistant Examiner.*